United States Patent [19]
Ishizawa et al.

[11] Patent Number: 5,310,608
[45] Date of Patent: May 10, 1994

[54] TEMPERATURE DIFFERENCE STORAGE BATTERY

[75] Inventors: Maki Ishizawa, Tokyo; Tsutomu Ogata, Sayama; Kazuhiko Shindo, Tokyo; Syuichi Kitada, Iruma; Mitsunori Koyama, Nishikatsura, all of Japan

[73] Assignee: Nippon Telegraph and Telephone Corporation, Tokyo, Japan

[21] Appl. No.: 138,440

[22] Filed: Oct. 20, 1993

[30] Foreign Application Priority Data

Oct. 21, 1992 [JP] Japan .................................. 4-283208
Nov. 16, 1992 [JP] Japan .................................. 4-305484

[51] Int. Cl.$^5$ ............................................ H01M 6/36
[52] U.S. Cl. ................................... 429/11; 429/24
[58] Field of Search .................... 429/11, 20, 24, 26, 429/62, 101, 105, 112, 17, 19

[56] References Cited

U.S. PATENT DOCUMENTS

| 4,211,828 | 7/1980 | Peck | 429/11 |
| 4,407,902 | 10/1983 | Kummer | 429/20 X |
| 4,410,606 | 10/1983 | Loutfy et al. | 429/20 X |

*Primary Examiner*—Anthony Skapars
*Attorney, Agent, or Firm*—Finnegan, Henderson, Farabow, Garrett & Dunner

[57] ABSTRACT

The temperature difference battery includes a solution 2 which contains redox ion couples having a temperature-dependent redox potential. A low-temperature (LT) electrode 1 and a high-temperature (HT) electrode 3 are disposed in the solution 2. A membrane film 6 impervious to the redox ion couples is disposed between the HT electrode 3 and the LT electrode 1. A LT power electrode 7 is disposed between the LT electrode 1 and the membrane film 6, and a HT power electrode 8 is disposed between the HT electrode 3 and the membrane film 6. When there is a temperature difference between the electrodes 1, 3, the redox potential of the ion couples change, and thermoelectric power is generated between the LT electrode 1 and the HT electrode 3, which is used to charge the battery. The concentration of the redox ion couples in the LT region and in the HT region increases as charging progresses, and the membrane 6 maintains the concentration difference thus storing the electrical power. Because the power electrodes 7, 8 are disposed in the solutions of different concentrations, an emf is generated by the concentration effect, and continuous power is delivered. By open circuiting the electrodes 1, 3, the continuous power deliver and can be continued until the concentration difference disappears, even after the temperature difference is eliminated. Therefore, the invented battery possesses charge storage, generation and power delivery capabilities. The battery can be used effectively for waste heat utilization.

3 Claims, 5 Drawing Sheets

TEMPERATURE DIFFERENCE STORAGE BATTERY

BACKGROUND OF THE INVENTION

1. Field of the Invention

The present invention relates to a storage battery which generates and stores electrical energy when there is a temperature difference, and discharges the electrical energy when there is no temperature difference. The battery can be used effectively in a wide variety of cases of thermal to electrical energy conversion utilizing heat sources such as plant waste heat, fuel cell heat, automotive-based heat such as exhaust gases and engine heat, hot springs, geothermal heat, solar heat, oceanic heat, facilities waste heat, incinerators, air conditioning equipment, radioisotopes and atomic reactors.

2. Technical Background

Conventionally, thermal/electrical energy converters based on temperature difference electrochemical batteries have been known. Such batteries comprise, as shown in FIG. 9, a low-temperature electrode 1, a high-temperature electrode 3, and disposed between the electrodes 1, 3, is a solution 2 containing redox ion couples which undergo a reversible charge transfer reaction between the electrode. A low-temperature medium 4 and a high-temperature medium 5 generate a temperature difference between the low-temperature electrode 1 and the high-temperature electrode 2, and an electromotive force (emf) is generated between the electrodes 1, 3.

If ferrocyanide and ferricyanide are used as the redox ion couple, for example, the following reactions take place, respectively, at the low-temperature electrode 1 and at the high-temperature electrode 3. The thermoelectric power generation is performed by negative ions (negative thermoelectric power generation), and the result is that the low-temperature electrode 1 becomes a positive electrode, and the high-temperature electrode 3 becomes a negative electrode.

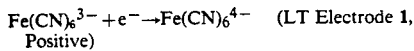
$Fe(CN)_6^{3-} + e^- \rightarrow Fe(CN)_6^{4-}$   (LT Electrode 1, Positive)

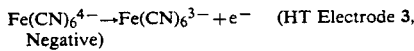
$Fe(CN)_6^{4-} \rightarrow Fe(CN)_6^{3-} + e^-$   (HT Electrode 3, Negative)

As shown above, at the low-temperature positive electrode, $Fe(CN)_6^{4-}$ ions are generated, and at the high-temperature negative electrode, $Fe(CN)_6^{3-}$ ions are generated. The generated ionic species migrate to their respective electrode by mechanisms such as diffusion and thermal convection, thereby establishing a steady state electrochemical reaction between the electrodes 1, 3 and causing an electric current to flow when a load is connected therebetween.

In such a temperature difference battery, when the temperature difference ceases to exist by stopping the circulation of heating medium, the battery loses not only the ability for generating an emf but also its ability to deliver a flow of electric current.

SUMMARY OF THE INVENTION

The purpose of the present invention is to present an electric storage battery which provides capabilities of power generation and storage when there is a temperature difference, by accumulating redox ion couples generated at the respective low-temperature electrode and the high-temperature electrode in separated battery solutions. When the temperature difference is eliminated, power can be delivered between a low-temperature power electrode which is disposed in the low temperature region and a high-temperature power electrode disposed in the high temperature region.

The present invention achieves the above objective with a battery comprising: a solution medium containing redox ion couples, having a temperature-dependent redox potential; a low-temperature electrode and a high-temperature electrode for generating a temperature difference disposed in the solution medium; a membrane film device which is impervious to the redox ion couples disposed between the low-temperature electrode and the high-temperature electrode; and a low-temperature power electrode disposed between the low-temperature electrode and the membrane film device, and a high-temperature power electrode disposed between the low-temperature electrode and the membrane film device.

The objective is also achieved with a battery comprising: a molten medium containing redox ion couples in a molten state, having a temperature-dependent redox potential; a low-temperature electrode and a high-temperature electrode for generating a temperature difference disposed in the molten medium; an ion conductive solid electrolyte which is impervious to the redox ion couples disposed between the low-temperature electrode and the high-temperature electrode; and a low-temperature power electrode disposed between the low-temperature electrode and the solid electrolyte and a high-temperature power electrode disposed between the low-temperature electrode and the solid electrolyte.

PREFERRED EMBODIMENTS OF THE INVENTION

First Embodiment

Figure 1:
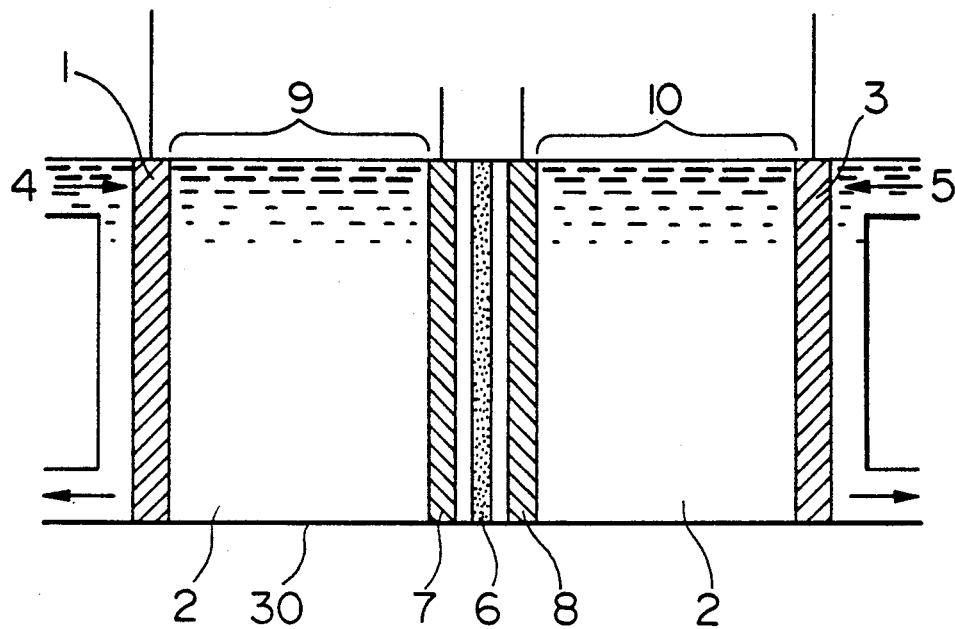
FIG. 1 is a schematic drawing of a first embodiment of the storage type temperature difference battery of the present invention.

A first embodiment will be explained with reference to the drawings. FIG. 1 is a schematic drawing of the first embodiment of the temperature difference battery (shortened to TD battery hereinbelow) which is based on a redox couple having a temperature-dependent redox potential. The TD battery comprises: a solution 2 containing the redox ion couples; a battery case 30 which is filled with the solution 2; a low-temperature electrode 1 disposed in the solution 2 and its associated low temperature medium 4; a high-temperature electrode 3 disposed in the solution 2 and its associated high temperature medium 5; a membrane film 6 impervious to the redox ions disposed between the electrodes 1, 3; a power electrode 8 disposed between the membrane film 6 and the electrode 3 on the high-temperature side of the TD battery; a power electrode 7 disposed between the membrane film 6 and the electrode 1 on the low-temperature side of the TD battery.

The battery case 30 is formed in a box shape, with a membrane film 6 disposed in the middle, and the low-temperature electrode (shortened to LT electrode) 1 and the high-temperature electrode (shortened to HT electrode) 3 at the respective ends of the battery case 30. On each side of the membrane 6, there is a low-temperature (LT) power electrode 7 and a high-temperature (HT) power electrode 8. The solution 2 fills a low temperature region 9 having the LT electrode 1 and the LT power electrode 7, and a high temperature region 10 having the HT electrode 3 and the HT power electrode 8.

In the above configuration, it is preferable that the distances between the membrane 6 and each of the LT power electrode 7 and the HT power electrode 8 be as short as possible. It is permissible for the LT and HT power electrodes 7, 8 to touch the membrane 6 so long as the electrodes 7, 8 are electrically insulated. By so decreasing the distance between the LT power electrode 7 and the HT power electrode 8, it becomes possible to decrease the temperature difference between the power electrodes 7, 8 to their practical limit.

In the TD battery of the configuration presented above, when the concentration of the redox ion couples in the low temperature region 9 and the high temperature region 10 is made equal, the TD battery generates a voltage proportional to the temperature difference existing between the LT electrode 1 and the HT electrode 3. With an open circuit between the LT power electrode 7 and the HT power electrode 8, the current in the TD battery flows when the LT electrode 1 and the HT electrode 3 are electrically connected to a load in accordance with the following reactions between the redox ions represented generally by $M^{Z+}$ and $M^{(Z+N)+}$:

$$M^{Z+} \rightarrow M^{(Z+N)+} + ne^- \quad \text{(at LT electrode 1)} \quad (1)$$

$$M^{(Z+N)+} + ne^- \rightarrow M^{Z+} \quad \text{(at HT electrode 3)} \quad (2)$$

for the case of thermoelectric power generation involving positive ions.

In the above TD battery, at the LT electrode 1, $M^{Z+}$ ions are being consumed while the $M^{(Z+N)+}$ ions are being accumulated. At the HT electrode 3, $M^{(Z+N)+}$ ions are being consumed while the $M^{Z+}$ ions are being accumulated. Because of the presence of the membrane 6 which is impervious to the redox ion couples, however, the solutions are prevented from becoming mixed by convection or diffusion. Therefore, the process leads to an increasing amount of the $M^{(Z+N)+}$ ions in the LT region 9 and an increasing amount of the $M^{Z+}$ ions in the HT region 10.

The concentration difference between the LT region 9 and the HT region 10 continues to increase until the emf generated by the concentration difference effect at the LT electrode 1 and the HT electrode 3 becomes zero. The charging reaction then ceases. The charge is retained as long as the concentration difference is maintained by the membrane 6.

Figure 2:
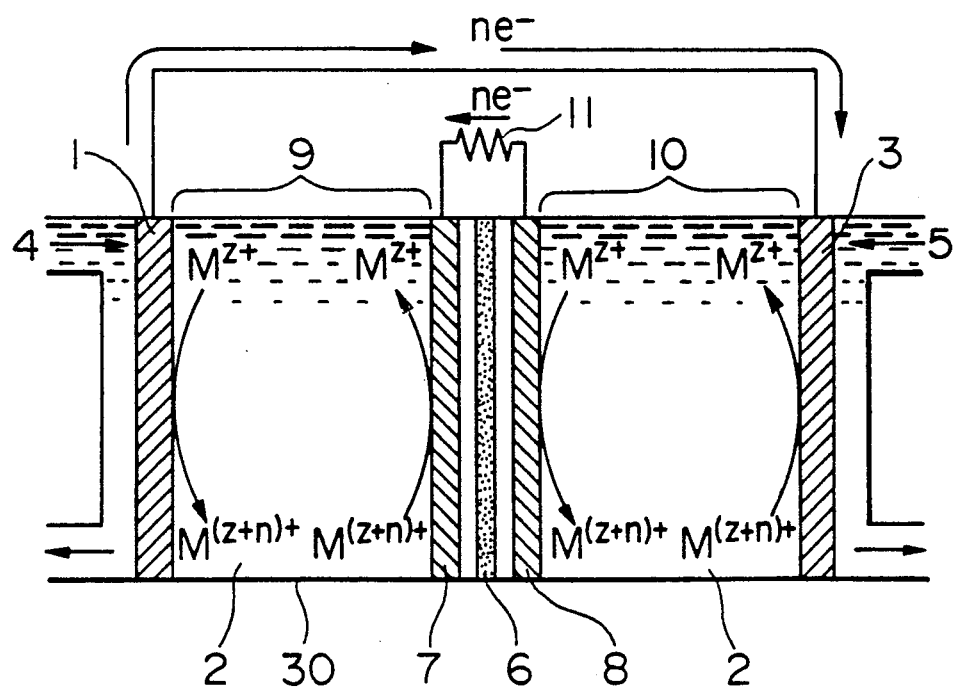
FIG. 2 is a schematic drawing illustrating the principle of electrical power generation in the first embodiment.

Next, the principle of a continuous power generation and power delivery when there is a temperature difference between the LT electrode 1 and the HT electrode 3 will be explained with reference to FIG. 2. In this case, the LT electrode 1 and the HT electrode 3 are connected while the LT power electrode 7 is connected through a load 11 to the HT power electrode 8. By bringing the power electrodes 7, 8 close together, the temperature difference therebetween is diminished, but there is a generation of emf caused by the difference in the concentration of the redox ion couples, $M^{Z+}$ and $M^{(Z+N)+}$, at the respective power electrodes 7, 8.

During the continuous power generation and delivery process, the following reactions take place: at the LT power electrode 7;

$$M^{(Z+N)+} + ne^- \rightarrow M^{Z+} \quad (3), \text{ and}$$

at the HT power electrode 8;

$$M^{Z+} \rightarrow M^{(Z+N)+} + ne^- \quad (4)$$

While the electrical power is being generated and delivered, the reactions proceed in the directions to decrease the concentration difference between the LT region 9 and the HT region 10.

On the other hand, at the LT electrode 1 and the HT electrode 3, the reactions (1) and (2) proceed in the direction to maintain the concentration difference.

The concentration difference in the LT region 9 and the HT region 10, during the continuous power generation, is maintained at the concentration difference existed in the initial charging period. This is because the reactions (3) and (4) occurring at the power electrodes 7, 8 connected to the load 11 are the rate determining, and the rates of consumption and generation of ion couples in the LT region 9 and the HT region 10 are maintained in balance.

So long as the temperature difference of the LT electrode 1 and the HT electrode 3 is maintained by the respective LT medium 4 and the HT medium 5, the reactions (Eqns 1 to 4) will occur at a steady state rate, thus leading to a continuous power generation. Also, so long as the concentration difference is maintained, a charge storing capability will be realized.

Next, if the temperature difference between the LT electrode 1 and the HT electrode 3 is eliminated, for example, by stopping the supply of heat by the HT medium 5, the reverse reaction of the reactions 1 and 2 can be prevented from occurring by immediately disconnecting the LT electrode 1 from the HT electrode 3. In this condition, the reactions 3 and 4 continue until the concentration of the redox ion couples in the LT region 9 and HT region 10 are equalized.

As described above, the TD battery has the capability to generate and store electrical power when there is a temperature difference, and when the temperature difference disappears, the TD battery is still able to supply electrical power.

The redox ion couple in the solution 2 can be chosen from a variety of species which generate power by positive ion couples or negative ion couples, and particularly preferable are those which can generate a large absolute value of electrical power. For example, the redox couples may be $Fe^{2+}/Fe^{3+}$, $Cu^+/Cu^{2+}$, $Te^{2+}/Te^{4+}$, $Hg^+/Hg^{2+}$, $Sn^{2+}/Sn^{4+}$, $Fe(CN)_6^{3-}/Fe(CN)_6^{4-}$. The redox ion couples are not limited to these examples, and they are satisfactory so long as they can generate thermoelectric power.

Also, for the membrane film 6 to accumulate the redox ion couples, any membrane material which does not permit the redox ion couples to pass therethrough will be acceptable. Ion exchange films are preferable, and when positive ion couples are involved in the solution 2, an ion exchange membrane film having a negative ion selectivity would be preferable; and when using negative redox ion couples, it would be preferable to employ a positive ion selective membrane.

It is preferable that the power electrodes 7, 8 have the properties to act as barriers to the redox ion couples, but do not interfere with the diffusion of other ions and solvents which should diffuse through the membrane film 6. For example, it is permissible to use materials, such as porous metals, porous carbon and metal sheet of netting construction of low electrical resistivity. The power electrodes may also be made by vapor depositing metal films on both sides of the membrane film 6. The power electrodes are not limited to the cited example materials, and they may be made from any low resistivity material which do not interfere with the diffusion of ion and solvent species, but present barriers to the redox ion couples.

There are no particular limitations to selecting the materials for the LT electrode 1 and the HT electrode 3, so long as they have electron collecting capabilities such as electrically conductive metals, carbon materials.

Experimental Example 1

The configuration of the TD battery is shown in FIG. 1. The solution 2, made of an aqueous solution containing 0.4 M/L of each potassium ferrocyanide and potassium ferricyanide, was charged into the casing 30. In the middle of the casing 30, a positive-ion exchange film of 0.1 mm thickness was placed as a membrane film 6. A platinum strip of 0.1 mm thickness was placed on each side of the membrane film 6 to act as a LT power electrode 7 and a HT power electrode 8. A platinum strip of 0.1 mm was placed at each end of the casing 30 to act as LT electrode 1 and the HT electrode 3.

The cross sectional areas of the LT power electrode 7, the HT power electrode 8, the LT electrode 1 and the HT electrode 3 were all 225 mm² (15×15 mm). Both the LT power electrode 7 and the HT power electrode 8 were in contact with the membrane film 6, and the distance of separation was 1 mm for low temperature region 9 (between the LT power electrode 7 and the LT electrode 1), and the high temperature region 10 (between the HT power electrode 8 and the HT electrode 3). The volume of each solution in the LT region 9 and the HT region 10 was 0.225 mL (15×15×1 mm).

Next, the temperatures of the LT medium and the HT medium were controlled so that the LT electrode 1 is at 10° C., and the HT electrode 3 is at 60° C. Under these conditions, the ferrocyanide·ferricyanide redox ion couples generated a negative thermoelectric power, and the LT electrode 1 became the positive electrode, and the HT electrode 3 became the negative electrode, and generated an electromotive force (emf) of 76 mV between therebetween. This voltage served to charge the TD battery initially. First, while the LT power electrode 7 and the HT power electrode 8 were open circuited, the LT electrode 1 and the HT electrode 3 were connected. Electric current flowed suddenly. The current flow led to an accumulation of the ferrocyanide ions in the LT region 9, and the ferricyanide ions in the HT region 10. As time passed, the difference in their concentrations increased, and after several minutes, the emf between the LT electrode 1 and the HT electrode 3 became zero. In the meantime, the open emf between the LT power electrode 7 and the HT power electrode 8 increased rapidly with the charging time, and reached 59 mV when the emf between the LT electrode 1 and the HT electrode 3 became zero. Next, the steady state power was generated at constant discharge current by shorting the LT electrode 1 and the HT electrode 3. The results were that at 1 mA constant discharge current, the voltage between the LT power electrode 7 and the HT power electrode 8 was 52.3 mV, and at 2 mA constant discharge current, the corresponding voltage was 46 mV. The results thus confirmed that a continuous power was being generated. Subsequently, the temperatures of the LT electrode 1 and HT electrode 3 were set at 23° C., and discharging was continued at 2 mA flowing between the LT power electrode 7 and the HT power electrode 8. It was possible to maintain a current flow of 2 mA for 0.6 hours, even after the temperature difference disappeared, at which time the TD battery retained a capacity of 1.2 mAhr.

The above results demonstrated that the TD battery exhibited capabilities of continuous power generation and power storage when there was a temperature difference, and after the temperature difference was eliminated, it was still capable of delivering the power.

Comparative Example 1

For comparison, the same experiment was conducted using a TD battery without the LT power electrode 7 and HT power electrode 8. The results showed that when there was a temperature difference, the comparison battery did not exhibit power generation capability, and when the temperature difference disappeared, the comparison battery exhibited a capacity of 1.4 mAhr between the LT electrode 1 and HT electrode 3.

Second Embodiment

Figure 3:
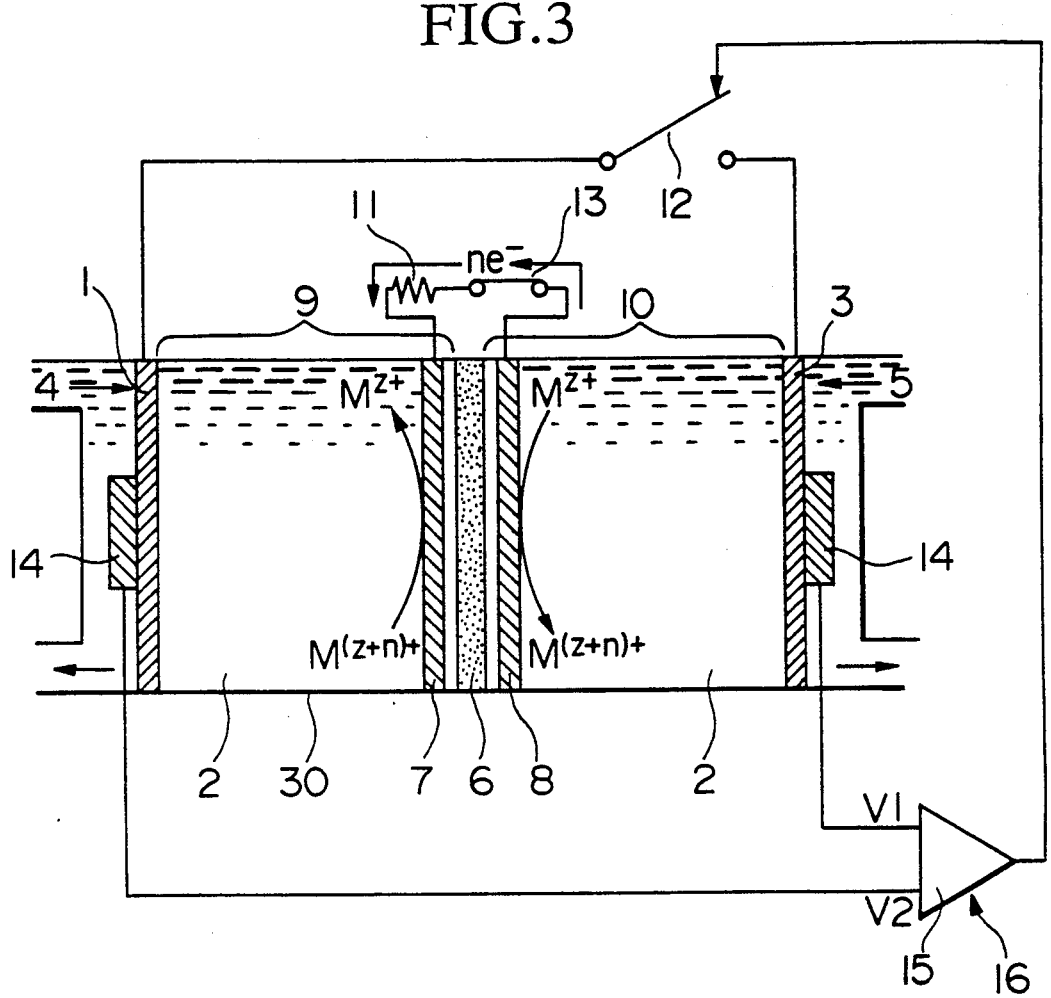
FIG. 3 is a schematic drawing of a second embodiment of the storage type temperature difference battery of the present invention.

A second embodiment of the TD battery will be presented with reference to the drawings. As shown in FIG. 3, the third embodiment TD battery is provided with extra testing components added to the TD battery of the first embodiment. Temperature sensing devices 14 are provided for the LT electrode 1 and the HT electrode 3, as well as a switching device 16 to switch between connecting (when the temperature difference is above a specific value) and disconnecting (when the temperature difference is in below the same specific value) electrical connections between the LT electrode 1 and HT electrode 3.

The provision of the temperature sensing devices 14 will ensure that as the temperature difference between the LT electrode 1 and HT electrode 3 decreases, the TD battery operation changes from the power generation and storage condition to the power delivery condition. By providing the switching device 16, the LT electrode 1 and the HT electrode 3 are automatically connected when the temperature difference is above the specific value, and the LT electrode 1 and HT electrode 3 are automatically disconnected when the temperature difference is below the specific value. By providing both the temperature sensing devices 14 and the switching device 16, discharge is automatically shut off when the temperature difference between the LT electrode 1 and the HT electrode 3 is low to prevent wasteful consumption of power, and when the temperature difference returns to the specific value, the TD battery is able to undertake power generation and storage so that the available energy is effectively utilized.

The second embodiment of the TD battery will be explained in more detail. The temperature sensing device 14 may include a thermocouple, and the switching device 16 comprises: a comparator 15 which detects the temperature difference between thee LT electrode 1 and HT electrode 3 according to the signal from the temperature sensing device 14; and a charging switch 12 which connects or disconnects the LT electrode 1 and the HT electrode 3 in accordance with the detected results by the comparator 15.

The temperature sensing device 14 is disposed on each of the LT electrode 1 and the HT electrode 3, and is connected to the comparator 15. The comparator 15 compares the electrical signals, such as voltage, from each of the temperature sensing devices 14, and when the voltage, corresponding to the temperature difference between the LT electrode 1 and HT electrode 3, is above the specific value, forwards an ON signal to the charging switch 12, thereby connecting the LT electrode 1 and the HT electrode 3. In this condition, the TD battery performs power generation and storage. When the comparator 15 detects that the temperature difference between the LT electrode 1 and the HT electrode 3 is below the specific value, and the voltage has decreased, it forwards an OFF signal to the charging switch 12, thus disconnecting the LT electrode 1 and the HT electrode 3, and supplies the power stored between the LT power electrode 7 and HT power electrode 8.

The LT power electrode 7 and HT power electrode 8 are connected through a load 11 and the power switch 13.

The temperature sensing device 14 may include various types of thermocouples which generate temperature dependent potential in combination with amplifier, as necessary, to connect to the comparator 15. The comparator 15 may include such a device as a pulse-width modulator (PWM) which sends an OFF signal to the charging switch 12 when the temperature difference is below the specific value and sends an ON signal when the difference is maintained.

Experimental Example 2

As shown in FIG. 1, in the middle of the casing 30, a positive-ion exchange film of 1 m height×1 m width×0.1 mm thickness was placed as a membrane film 6. A platinum strip of 1 m height×1 m width×0.1 mm thickness was placed on each side of the membrane film 6 to act as a LT power electrode 7 and a HT power electrode 8. The solution 2, made of an aqueous solution containing 0.4 M/L of each potassium ferrocyanide and potassium ferricyanide, was charged into the casing 30. The LT power electrode 7 and HT power electrode 8 were connected through the charging switch 12.

A platinum strip of 1 m height×1 m width×0.5 mm thickness was placed at each end of the casing 30 to act as LT electrode 1 and the HT electrode 3. The region bounded by the LT electrode 1 and the membrane film 6 was the LT region 9, and the regions bounded by the HT electrode 3 and the membrane 6 was the HT region 10. A fine wire thermocouple (type CR) of 0.25 mm diameter was embedded in the center of each of the LT electrode 1 and the HT electrode 3, to act as the temperature sensing device 14.

The temperature sensing device 14 was connected to the comparator 15 through an operational amplifier. The comparator 15 was a PWM (MB3759) and was connected to the charging switch 12 to receive the signal from the comparator 15. The LT power electrode 7 and the HT power electrode 8 were disposed near the membrane film 6, and the width of the low temperature region 9 (between LT power electrode 7 and LT electrode 1) was 1 mm and the width of the high temperature region 10 (between HT power electrode 8 and HT electrode 3) was 1 mm. The volume of the solution 2 containing the redox ion couples was 1 L in each low and high temperature regions 9, 10. The LT electrode 1 was made to contact the LT medium 4, and the HT electrode 3 was made to contact the HT medium 5.

Next, the operation of the second embodiment will be explained. First, the LT medium 4 and the HT medium 5 were circulated, thereby setting the LT electrode 1 at 15° C., and the HT electrode 3 at 85° C. Then, the ferrocyanide ion couples and ferricyanide ion couples generated a negative emf, thereby making the LT electrode 1 positive and the HT electrode 3 negative, and generated 100 mV emf between the positive and negative electrodes.

Figure 4:
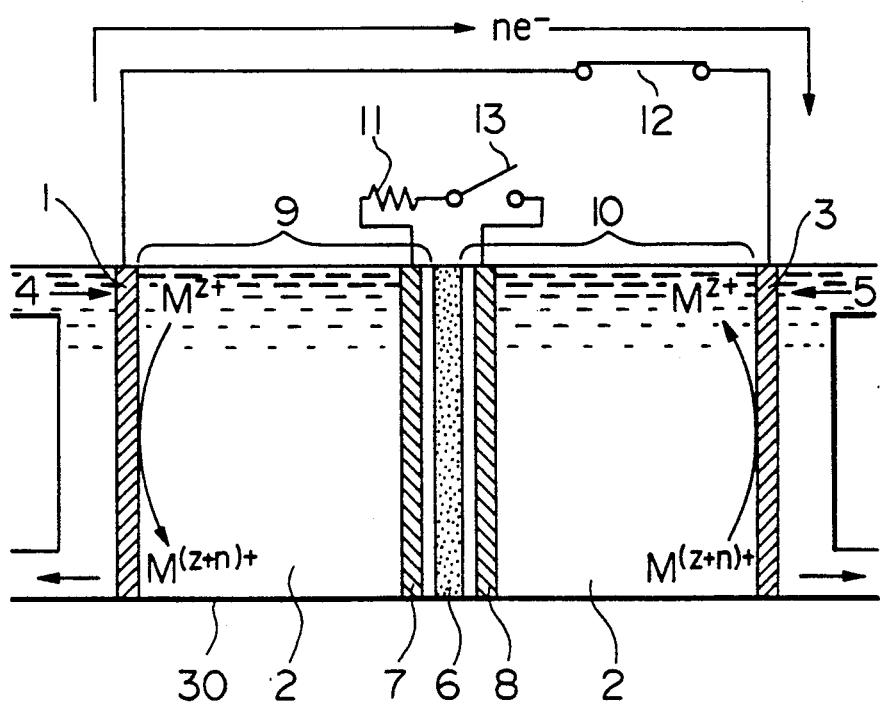
FIG. 4 is a schematic drawing illustrating the principle of charging in the second embodiment.

Initial charging of the TD battery was made using this emf. First, as shown in FIG. 4, the power switch 13 was opened to disconnect the LT power electrode 7 and the HT power electrode 8, and the LT electrode 1 and the HT electrode 3 were connected with the charging switch 12. Then, an electric current flowed quickly, and prompted the ferrocyanide ions to be accumulated in the LT region 9, and ferricyanide ions in the HT region. After several minutes of continuing increase in the concentration difference between the LT region 9 and HT region 10, the emf between the LT electrode 1 and HT electrode 3 became zero. The open circuit emf between the LT electrode 1 and the HT electrode 3 increased rapidly with time during the initial charging period, and reached 95 mV, when the emf between the LT electrode 1 and the HT electrode 3 became zero. The initial charging was thus completed.

Figure 5:
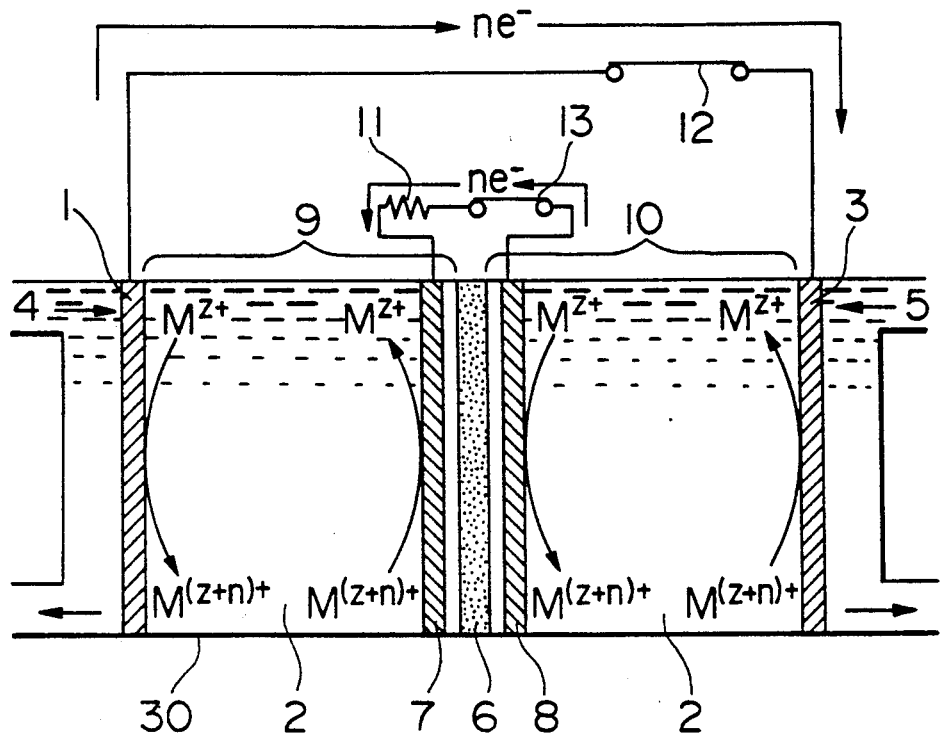
FIG. 5 is a schematic drawing illustrating the principle of electrical power generation and storage in the second embodiment.

The TD battery of the second embodiment was able to perform continuous power generation and storage automatically when there was a temperature difference, and to deliver power when the temperature difference diminished. First, the temperature sensing device 14 and the charging switch 12 were connected to the comparator 15. As shown in FIG. 5, the LT power electrode 7 and the HT power electrode 8 were connected through the power switch 13, and power delivery was performed at a constant current of 4 A. A constant voltage of 84 mV was observed. Under the conditions of LT electrode 1 at 15° C. and the HT electrode 3 at 85° C. creating a temperature difference of 70° C., it was confirmed that the charging switch 12 always was ON thus connecting the LT electrode 1 and the HT electrode 3, and generating a constant voltage while maintaining the concentration difference between the LT region 9 and the HT region 10.

When the supply of heat to the HT electrode 3 from the HT medium 5 was stopped, the HT electrode 3 could not maintain the temperature of 85° C., and as the temperature dropped, the signal to the comparator 15 also decreased, and when a specific value was reached, the comparator 15 forwarded an OFF signal to the charging switch 12, thereby opening the charging switch 12, and open circuited the LT electrode 1 from the HT electrode 3. The temperature of the HT electrode 3 continued to decrease, but a constant current of 4 amperes continued to flow between the LT power electrode 7 and the HT power electrode 8. After ten minutes of constant current discharge, heat was again supplied by the HT medium 5. The temperature of the HT electrode 3 rose, and when it reached 85° C., the comparator 15 generated an ON signal, and connected the LT electrode 1 and HT electrode 3 through the charging switch 12. Subsequently, while delivering power at a constant current, the voltage rose and returned to the initial voltage of 84 mV.

The above results demonstrated that by providing a temperature sensing device 14 and a switching device 16, a TD battery was able to perform an automatic power generation and storage operation when there was a temperature difference, and to perform a power delivery operation when the temperature difference decreased.

The TD battery of the above configuration having both temperature sensing device 14 and the switching device 16 enabled to connect the electrodes 1, 3, when their temperature difference was above the specific value, and disconnected the LT electrode 1 from the HT electrode 3 when the temperature difference was below the specific value. Therefore, the TD battery of the present invention permits an automatic operation, and it should be quite useful, for example, as a backup power source based on waste heat utilization.

Comparative Experiment 2

Figure 6:
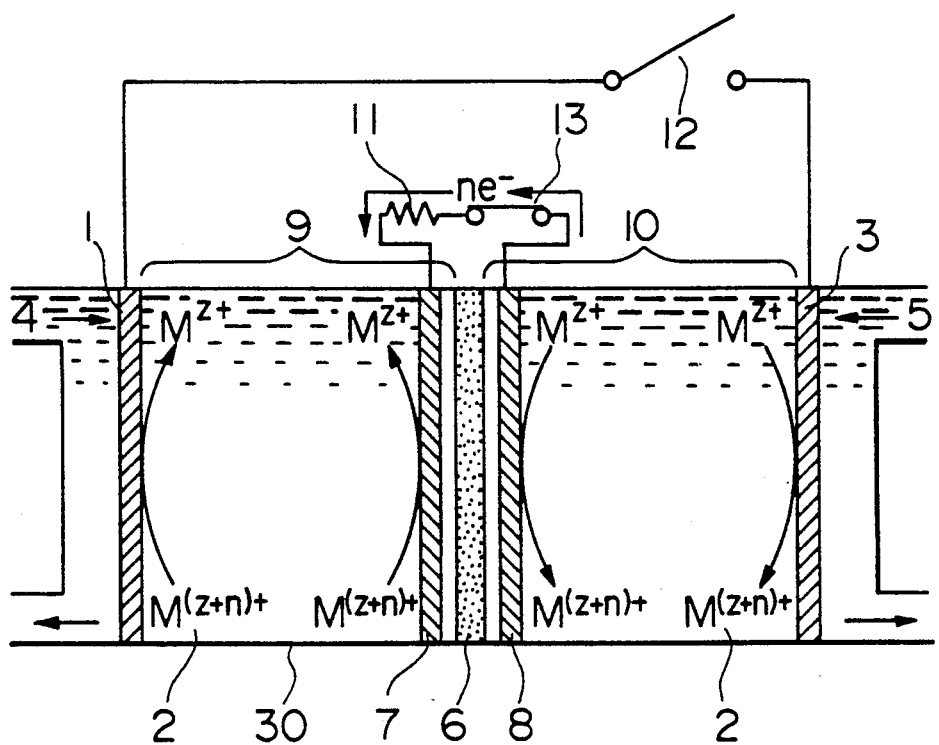
FIG. 6 is a schematic drawing showing the configuration of a second comparison battery in the second embodiment.

For comparison purposes, a comparative experiment was carried out by removing the temperature sensing device 14 and the comparator 15 from embodiment 2, as shown in FIG. 6. When there is a temperature difference, the TD battery performed the power generation and storage operation. When the heat supply was stopped, with the decrease in the temperature of the HT electrode 3, the electrons flowed from the HT electrode 3 to the LT electrode 1, and it was not possible to deliver power between the LT power electrode 7 and HT power electrode 8.

Third Embodiment

Figure 7:
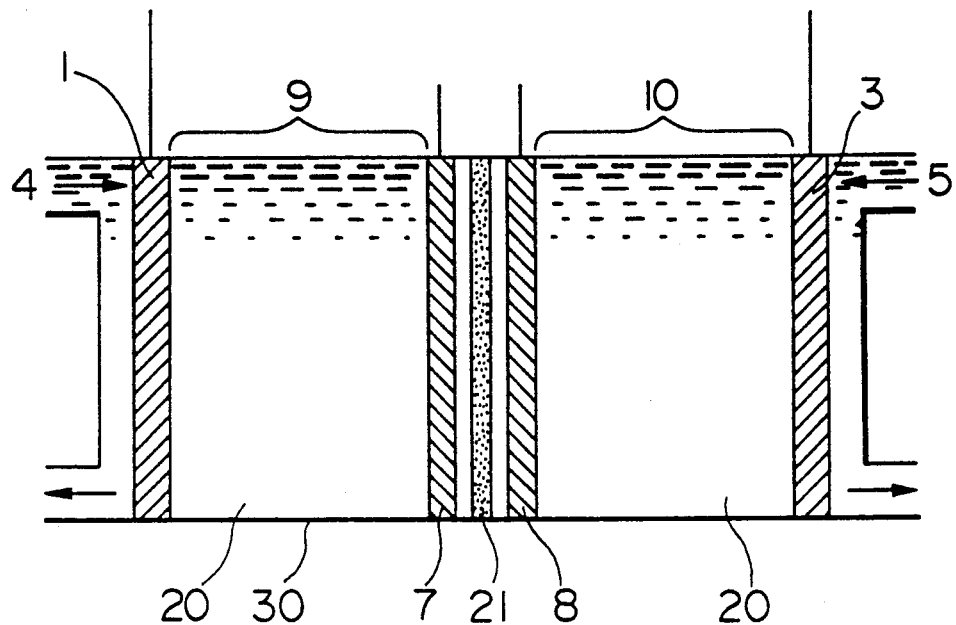
FIG. 7 is a schematic drawing of a third embodiment.
Figure 8:
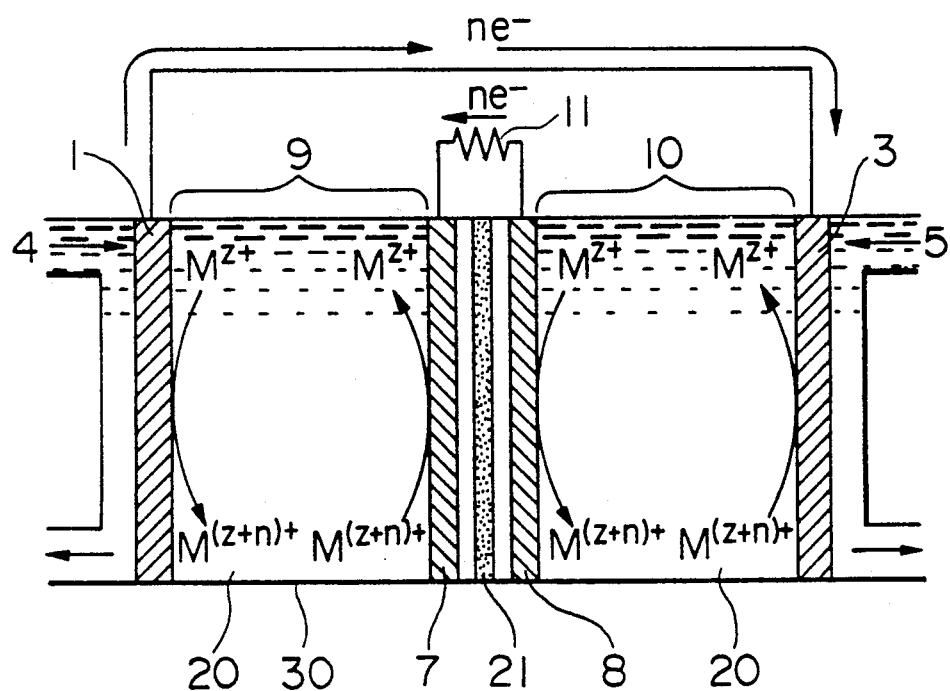
FIG. 8 is a schematic drawing illustrating the principle of electrical power generation in the third embodiment.
Figure 9:
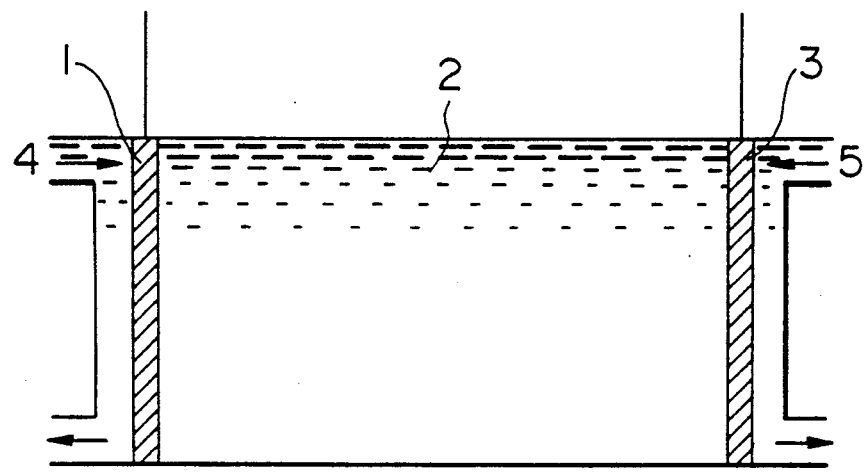
FIG. 9 is a schematic drawing illustrating the conventional temperature difference battery.

A third embodiment will be explained with reference to FIGS. 7, and 8. In FIG. 7, instead of the solution used in the first embodiment, a molten medium 20 made from a compound containing the redox couples having a temperature-dependent redox potential, and instead of the membrane film, an ion conductive solid electrolyte 21 which is impervious to the redox ion couples were used. In other words, the TD battery of the third embodiment performs thermoelectric power generation by placing the compound containing the redox couples between the LT electrode 1 and the HT electrode 3, and storing the respective redox ions generated at the LT electrode 1 and the HT electrode 3. The TD battery performs power generation and storage at the LT power electrode 7 (between the solid electrolyte 21 and the LT electrode 1) and HT power electrode 8 (between the solid electrolyte 21 and the HT electrode 3) when there is a temperature difference between the electrodes 1, 3. When the temperature difference disappears, the power delivery capability is generated. Because the solution is replaced with the molten medium 20, a solvent such as water can be replaced with a medium which can withstand a higher temperature. It follows that the TD battery of the third embodiment can be operated at higher temperatures than the solvent-based TD batteries.

The solid electrolyte 21 accumulates redox ion couples such as halogen-system ions exemplified by $PbCl_2$-, $BaCl_2$- and $SrBr_2$-based solid electrolytes.

The redox couples for molten medium 20 are those generally used in temperature difference batteries of positive or negative thermoelectric power generation. For example, $Fe^{2+}/Fe^{3+}$, $Cu^+/Cu^{2+}$, $Te^{2+}/Te^{4+}$, $Hg^+/Hg^{2+}$ and $Sn^{2+}/Sn^{4+}$ are suitable. The negative ions for forming a chemical compound with the above redox couples may be halogen ions such as $Cl^-$, $Br^-$. However, the molten medium is not limited to the above-mentioned substances, and any redox ion couples which are capable of generating thermoelectric power, and are able to form a molten salt when heated would be satisfactory.

It is preferable that the LT power electrode 7 and the HT power electrode 8 are made of a material to prevent the redox ion couples to pass through, and allows the solid electrolyte 21 to pass through. Suitable materials are porous metals having a low electrical resistance, porous carbon, nettings made of metal strips. It is also permissible to deposit a metal coating on both sides of the solid electrolyte 21, and use it as a power electrode. The materials for the power electrodes are not limited to those mentioned above, and it is preferable that they have a low electrical resistivity and allows ions other than the redox ions to pass through.

The material for the LT electrode 1 and the HT electrode 3 is not particularly limited so long as it has an electron collecting capability such as metals of good electrical conductivity and carbon.

The molten medium 20 generates a thermoelectric power proportional to the temperature difference between the LT electrode 1 and the HT electrode 3 when the redox ion couples fill the LT region 9 and the HT region 10 at the same concentration. When the LT power electrode 7 and HT power electrode 8 are open circuited, and the HT electrode 3 and the LT electrode 1 are closed, an electric current flows according to the following reaction. For positive generation of thermoelectric power, redox couple compound given by the general formulae $ML_z$, $ML_{z+n}$ (where M is a metal species and L is a monovalent species) separate into positive redox ion couples, $M^{z+}$ and $M^{(Z+N)+}$ of Z and $(Z+n)$ valences, and negative ion, $(L^-)$, of single valency.

At the LT electrode 1, the following reaction is progressing,

$$M^{z+} \rightarrow M^{(Z+N)+} + ne^- \qquad (5)$$

At the HT electrode 3, the following reaction is progressing,

$$M^{(Z+N)+} + ne^- \rightarrow M^+, \qquad (6)$$

and an electric current flows as a result.

Because the solid electrolyte 21 allows only the $L^-$ ions to pass through, and not the redox couples, $M^{z+}$ ions are consumed while $M^{(Z+N)+}$ ions are being accumulated at the LT electrode 1. On the HT electrode 3, $M^{(Z+N)+}$ ions are being consumed while $M^{z+}$ ions are being accumulated. Therefore, the concentration difference of the $M^{z+}$ and $M^{(z+N)+}$ ions increases at the electrodes 1, 3. In other words, by providing the solid electrolyte 21 which is impervious to the redox ion couples, the concentration of the $M^{(z+N)+}$ ions increases at the LT electrode 1, and the concentration of the $M^{z+}$ ions increases at the HT electrode 3, and the difference in the concentrations is maintained. This difference increases until the emf generated by the temperature difference between the LT electrode 1 and the HT electrode 3 becomes zero, and the charging reaction is completed.

Next, the method of continuous generation of power will be explained. As shown in FIG. 8, when there is a temperature difference between the LT electrode 1 and the HT electrode 3, the LT electrode 1 is connected to the HT electrode 3, and the LT power electrode 7 is connected to the HT power electrode 8 with a load 11. It is preferable that the distance of separation between the power electrodes 7, 8 be as small as possible, and if they are insulated, the power electrodes 7, 8 may be made to contact the solid electrolyte 21. By decreasing the separation distance, the temperature difference can be made extremely small. Therefore, an emf is generated by the concentration difference between the LT power electrode 7 and the HT power electrode 8, thus enabling to provide a continuous electrical power generation.

During the continuous generation of power, the following reactions are caused by the redox ion couples.

At the LT power electrode 7,

$$M^{(Z+N)+} + ne^- \rightarrow M^{z+} \quad (7), \text{ and}$$

at the HT power electrode 8,

$$M^{z+} \rightarrow M^{(Z+N)+} + ne^- \quad (8).$$

These reactions proceed in the direction to diminish the concentration difference between the LT region 9 and the HT region 10.

In the meantime, at the LT electrode 1 and the HT electrode 3, the reactions (5) and (6) proceed in the direction to maintain the concentration difference in the molten medium 20. Because the reactions (7) and (8) which occur at the LT power electrode 7 and the HT power electrode 8 through the load 11 are rate determining, the concentration difference between the LT region 9 and the HT region 10 is maintained at the initial value. So long as the temperature difference is maintained between the electrodes 1, 3 by the LT and HT media 4, 5, the reactions (5) to (8) inclusively occur as a result, and the continuous state generation of power is realized. Also, as the concentration difference is maintained between the LT and HT regions 9, 10, the power storage capability is realized.

Next, when the temperature difference between the electrodes 1, 3 disappears, the reverse reaction of (5) and (6) can be prevented by immediately disconnecting the electrodes 1, 3. The reactions (7) and (8) proceed until the redox couple concentrations in the LT and HT regions 9, 10 become equal to each other, thereby providing power delivery.

As presented above, the TD battery of the third embodiment provides power generation and storage capabilities when there is a temperature difference, and power delivery capability when the temperature difference disappears. Further, it should be noted that the temperature sensing device 14 and the switching device 16 used in the first and second embodiments can also be utilized for the third embodiment.

Experimental Example 3

In the center region of the casing 30, a $BaCl_2$-based solid electrolyte of 0.1 mm thickness was placed as the ion conductive solid electrolyte 21. On each side of the solid electrolyte 21, a LT power electrode 7 and a HT power electrode 8 made of 80 mesh platinum was disposed. A compound made of an equal moles of CuCl and $CuCl_2$ was used as the redox couples for the molten medium 20. A LT electrode 1 and a HT electrode 3 made of platinum strips of 0.1 mm thickness were placed at the respective ends of the casing 30. The cross sectional areas of the LT and HT electrodes 1, 3, and the LT and HT electrodes 7, 8 were respectively 225 $mm^2$ (15×15 mm). The LT power electrode 7 and the HT power electrode 8 were disposed so as to place the insulating solid electrolyte 21 inbetween. The widths of the LT region 9 and the HT region 10 were made to be 1 mm each, and the volume of the redox compound in the LT and HT regions 9, 10 was made to be 225 mL (15×15×1 mm).

The temperature was controlled so that the LT electrode 1 and the HT electrode 3 were at 500° and 800° C., respectively. The Cu redox ion couples exhibited positive thermoelectric generation, and the LT electrode 1 was negative, and the HT electrode 3 was positive, and an emf of 150 mV was generated between the electrodes 1, 3. Initial charging was performed using this power. First, with the LT power electrode 7 and HT power electrode 8 was open circuited, and the LT electrode 1 and the HT electrode 3 were connected. An electric current flowed rapidly, and $Cu^{2+}$ ions accumulated in the LT region 9, and $Cu^+$ ions accumulated in the HT region 10, and the concentration difference increased, and after several minutes, the emf between the LT electrode 1 and the HT electrode 3 became zero. The open circuit voltage between the electrodes 7, 8 during the initial charging increased rapidly with charging time, and reached 138 mV when the emf between the LT electrode 1 and the HT electrode 3 became zero. Next, a constant current discharging experiment was conducted with the LT electrode 1 and HT electrode 3 connected. At 10 mA, the voltage between the LT power electrode 7 and the HT power electrode 8 was constant at 115 mV, and at 20 mA, it was 92 mV. These trials confirmed that continuous power generation was being achieved. Next, the temperature difference was eliminated, and while the LT electrode 1 and the HT electrode 3 were open circuited, the LT power electrode 7 and the HT power electrode 8 were loaded at 20 mA. The power was delivered for 2.5 hours, and it was found that even after the temperature difference was eliminated, the TD battery retained a capacity of 50 mAhr.

The results presented above demonstrated that the TD battery of the third embodiment provided power generation and storage capabilities when there was a temperature difference, and when the temperature difference was eliminated, a power delivery capability was exhibited. In particular in this embodiment, because a molten medium containing a redox couple compound and a solid electrolyte was used instead of the membrane film, solvent such as water was not necessary. Therefore, the molten medium can be heated to a high temperature, thus enabling to widen the applicable temperature difference between the HT and LT electrodes.

What is claimed is:

1. An electric storage battery which operates by temperature difference comprising:
    (a) a solution containing redox ion couples having a temperature-dependent redox potential;
    (b) a low-temperature electrode and a high-temperature electrode for generating a temperature difference disposed in said solution;
    (c) a membrane film means which is impervious to said redox ion couples disposed between said low-temperature electrode and said high-temperature electrode; and
    (d) a low-temperature power electrode disposed between said low-temperature electrode and said membrane film means and a high-temperature power electrode disposed between said low-temperature electrode and said membrane film means.

2. A battery as claimed in claim 1, said battery further comprising: a temperature sensing device to determine the temperatures of said low-temperature electrode and said high-temperature electrode; and a switching device for electrically connecting the low-temperature electrode to the high-temperature electrode when the temperature difference is above a specific value, and for electrically disconnecting the low-temperature electrode from the high-temperature electrode when the temperature difference is below the specific value.

3. An electric storage battery which operates by temperature difference comprising:
    (a) a molten medium containing redox ion couples, having a temperature-dependent redox potential, in a molten state;
    (b) a low-temperature electrode and a high-temperature electrode for generating a temperature difference disposed in said molten medium;
    (c) an ion conductive solid electrolyte which is impervious to said redox ion couples disposed between said low-temperature electrode and said high-temperature electrode; and
    (d) a low-temperature power electrode disposed between said low-temperature electrode and said solid electrolyte and a high-temperature power electrode disposed between said low-temperature electrode and said solid electrolyte.

* * * * *

UNITED STATES PATENT AND TRADEMARK OFFICE
CERTIFICATE OF CORRECTION

PATENT NO. : 5,310,608
DATED : May 10, 1994
INVENTOR(S) : Maki Ishizawa et al.

It is certified that error appears in the above-indentified patent and that said Letters Patent is hereby corrected as shown below:

In the Abstract, lines 23-24 "the continuous power deliver" should read --the continuous power is delivered--.

Signed and Sealed this

Third Day of January, 1995

Attest:

BRUCE LEHMAN

Attesting Officer

Commissioner of Patents and Trademarks